(12) United States Patent
Tsuda

(10) Patent No.: US 8,487,913 B2
(45) Date of Patent: Jul. 16, 2013

(54) AREA SENSOR, LIQUID CRYSTAL DISPLAY UNIT, AND POSITION DETECTION METHOD

(75) Inventor: Kazuhiko Tsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

(21) Appl. No.: 13/143,601

(22) PCT Filed: Oct. 16, 2009

(86) PCT No.: PCT/JP2009/067908
§ 371 (c)(1),
(2), (4) Date: Jul. 7, 2011

(87) PCT Pub. No.: WO2010/079647
PCT Pub. Date: Jul. 15, 2010

(65) Prior Publication Data
US 2011/0267317 A1    Nov. 3, 2011

(30) Foreign Application Priority Data
Jan. 9, 2009   (JP) .................. 2009-003908

(51) Int. Cl.
*G06F 3/042*   (2006.01)
(52) U.S. Cl.
USPC .......................................... 345/175; 349/96
(58) Field of Classification Search
None
See application file for complete search history.

(56) References Cited

U.S. PATENT DOCUMENTS

| 6,822,711 B1 * | 11/2004 | Yoshida et al. ........... 349/115 |
| 2004/0246434 A1 * | 12/2004 | Ohashi et al. ........... 349/199 |
| 2006/0007224 A1 | 1/2006 | Hayashi et al. |
| 2006/0170658 A1 | 8/2006 | Nakamura et al. |
| 2008/0246708 A1 | 10/2008 | Ishiguro |

FOREIGN PATENT DOCUMENTS

| JP | 2001-67180 A | 3/2001 |
| JP | 2005-331765 A | 12/2005 |
| JP | 2006-18219 A | 1/2006 |
| JP | 2006-244446 A | 9/2006 |
| JP | 2008-257495 A | 10/2008 |

* cited by examiner

*Primary Examiner* — Jason Olson
(74) *Attorney, Agent, or Firm* — Chen Yoshimura LLP

(57) ABSTRACT

A liquid crystal display unit of the present invention includes a liquid crystal panel in which an optical sensor for detecting the intensity of light entered from a front side thereof is incorporated, a backlight that emits light onto the liquid crystal panel from a rear side, and a polarizing reflection plate that is disposed between the liquid crystal panel and a front side polarizing plate so as to transmit a component of light emitted from the backlight and transmitted through the liquid crystal panel that oscillates in a direction parallel to the transmission axis of the front side polarizing plate, and to reflect a component of the light that oscillates in a direction perpendicular to the transmission axis.

8 Claims, 6 Drawing Sheets

AREA SENSOR, LIQUID CRYSTAL DISPLAY UNIT, AND POSITION DETECTION METHOD

TECHNICAL FIELD

The present invention relates to an area sensor and to a liquid crystal display unit, which are equipped with a liquid crystal panel including an optical sensor.

BACKGROUND ART

A touch panel including not only a function to display an image, but also a function to detect a position touched by an object (a pen for input or the like) has been in wide use.

There are conventional touch panels made of two transparent substrates disposed such that transparent electrodes face each other through a spacer of several microns. In this touch panel, sensors connected to these transparent electrodes detect changes in resistance value or electric capacitance at a point where the transparent electrodes, which the two transparent substrates respectively have, touch each other, to detect a position touched by an object. However, because the transparent substrates are disposed slightly far from the display surface, there are problems that a user feels discomfort when operating, and the display quality is significantly lowered due to a generation of unnecessary reflected light.

In light of such problems, as the performance of elements constituting a TFT liquid crystal display has improved in recent years, TFT liquid crystal displays with a touch panel function in which a sensor is incorporated in respective pixels has been developed (for example, see Patent Document 1). This display enables a user to directly touch an image display surface because optical sensor elements are disposed next to TFT elements, and therefore, a user can specify a position without a feeling of discomfort. In addition, because this display does not have a structure in which transparent substrates are laminated, no unnecessary reflected light is generated, and an image can be displayed vividly.

In this TFT liquid crystal display, the optical sensor elements detect a position touched by a user. In this method, there are a method of detecting the shadow of an object such as a pen or a finger created by surrounding light, and a method of detecting light, which is transmitted light emitted from a backlight of the liquid crystal panel reflected on an object.

In TFT liquid crystal displays using the former method, the sensor elements could detect the shadow of an object just by getting the object closer to the display surface, causing a problem of an unintended input by a user. On the other hand, TFT liquid crystal displays using the latter method have a characteristic that the intensity of reflected light, which is detected by optical sensor elements, prominently increases when an object touches the display surface, and therefore, the above-mentioned problem is unlikely to occur.

Due to such a characteristic, various devices using the optical sensor element of the latter method as an area sensor (for example, an optical pointing input device in Patent Document 2) have been developed, besides the liquid crystal display unit described above.

RELATED ART DOCUMENTS

Patent Documents

Patent Document 1: Japanese Patent Application Laid-Open Publication No. 2006-18219 (published on Jan. 19, 2006)

Patent Document 2: Japanese Patent Application Laid-Open Publication No. 2001-67180 (published on Mar. 16, 2001)

SUMMARY OF THE INVENTION

Problems to be Solved by the Invention

However, in the above-mentioned liquid crystal display unit that receives light of the backlight, which has been reflected on an object, to detect a position of the object, there was a problem of difficulty detecting the position of the object when the object touches a region where black is displayed.

A detailed description will be made regarding this using FIG. 7. FIGS. 7(a) and 7(b) show images displayed on a liquid crystal panel 20 (images in the middle) when the images are a white display or a black display, respectively, and images generated in accordance with the intensity of light received by optical sensor elements 30 when a finger or a pen is touching a detection target surface 300a (images at the bottom). When an image displayed on the liquid crystal panel 20 is a white image (image in which all the pixels are the highest gray scale), light from the backlight 10, which has passed through a front side polarizing plate 40a, is reflected by a finger or a pen, and as shown in the bottom image of FIG. 7(a), the optical sensor elements 30 receive the reflected light, and therefore, the touched position can be detected. However, when an image displayed on the liquid crystal panel 20 is a black image (image in which all the pixels are the lowest gray scale), light from the backlight 10 is absorbed by the front side polarizing plate 40a. Accordingly, as shown in the bottom image of FIG. 7(b), the optical sensor elements 30 do not receive light, and therefore, the touched position cannot be detected.

The present invention was devised in light of the above-mentioned problem, and its main purpose is to achieve a liquid crystal display unit, which receives reflected light of the backlight to detect a position where an object touched on the detection target surface of the front side polarizing plate, and in which the position of the object can be detected even when an image displayed on the liquid crystal panel is a black image.

Means for Solving the Problems

In order to resolve the above-mentioned problem, a liquid crystal display unit of the present invention includes: a liquid crystal panel including an optical sensor for detecting an intensity distribution of light entered from a front side; a light-emitting part that emits light onto the above-mentioned liquid crystal panel from a rear side; and a polarizing reflection plate that transmits, among light emitted from the above-mentioned light-emitting part and transmitted through the above-mentioned liquid crystal panel, a component of the light that oscillates in a direction parallel to the transmission axis of a polarizing plate disposed on a front side of the above-mentioned liquid crystal panel, and reflects a component of the light that oscillates in a direction perpendicular to the above-mentioned transmission axis, the polarizing reflection plate being disposed between the above-mentioned liquid crystal panel and the above-mentioned polarizing plate.

According to the above-mentioned structure, when an object is not touching the above-mentioned polarizing plate and if the orientation of liquid crystals constituting the above-mentioned liquid crystal panel is controlled to be uniform, the oscillation direction of light that has been emitted from the above-mentioned light-emitting part and transmitted through the above-mentioned liquid crystal panel becomes uniform.

Accordingly, in this case, the intensity of reflected light, which has been reflected in respective regions of the above-mentioned polarizing reflection plate, also becomes uniform, and the above-mentioned optical sensor detects the light having a uniform intensity distribution.

Further, when an object touches the above-mentioned polarizing plate and if the orientation of liquid crystal molecules, which constitute the liquid crystal layer of the above-mentioned liquid crystal panel, is controlled to be uniform, the liquid crystal orientation of the touched region changes. Then, the oscillation direction of light transmitted through the touched region of the above-mentioned liquid crystal panel becomes different from the oscillation direction of light transmitted through other regions of the above-mentioned liquid crystal panel. That is, the intensity of reflected light, which has been reflected in the region on the above-mentioned polarizing reflection plate that overlaps with the touched region of the liquid crystal panel, becomes different from the intensity of reflected light, which has been reflected in other regions of the above-mentioned polarizing reflection plate.

Accordingly, when an object touches the above-mentioned polarizing plate, the above-mentioned optical sensor detects light having an intensity distribution, in which the region corresponding to the touched position has the intensity different from the intensity of other regions, and in which the other regions have uniform intensity.

Therefore, the liquid crystal display unit achieves an effect that, when uniformly controlling the orientation of the liquid crystals constituting the above-mentioned liquid crystal panel, a position where an object touched on the polarizing plate can be detected in accordance with the intensity distribution of light detected by the optical sensor, even when an image displayed on the above-mentioned liquid crystal panel is a black image.

In order to resolve the above-mentioned problem, a position detection method of the present invention for detecting a position where an object touches on a front side of the liquid crystal panel includes: emitting light onto the above-mentioned liquid crystal panel from a rear side; using a polarizing reflection plate disposed between the above-mentioned liquid crystal panel and a polarizing plate disposed on the front side of the above-mentioned liquid crystal panel, transmitting a component of light passed through the above-mentioned liquid crystal panel that oscillates in a direction parallel to the transmission axis of the above-mentioned polarizing plate, and reflecting a component of the light that oscillates in a direction perpendicular to the above-mentioned transmission axis; and detecting an intensity distribution of light entering from the above-mentioned front side to detect the above-mentioned position.

The above-mentioned structure can achieve functional effects, which are similar to those of the liquid crystal display unit of the present invention.

It is preferable that the above-mentioned liquid crystal display unit further include: detected image generation means for generating a detected image, indicating an intensity of light detected by the above-mentioned optical sensor; negative image generation means for generating a negative image of an image displayed on the above-mentioned liquid crystal panel; differential image generation means for generating a differential image between the above-mentioned negative image and the above-mentioned detected image; and extraction means for extracting coordinates of pixels, having gray scale equal to or higher than a prescribed threshold in the above-mentioned differential image.

Here, an image displayed on the above-mentioned liquid crystal panel is an image that is to be displayed when the liquid crystal orientation of the above-mentioned liquid crystal panel is not disturbed due to a touch by an object on the above-mentioned polarizing plate.

The above-mentioned structure further achieves an effect of being able to detect a position where an object touches on the above-mentioned polarizing plate, no matter what image is displayed on the liquid crystal panel, by extracting coordinates of pixels having gray scale equal to or higher than a prescribed threshold included in the differential image, which was generated by the above-mentioned differential image generation means when the object touches the above-mentioned polarizing plate.

It is preferable that the above-mentioned liquid crystal display unit include a retarder disposed between the above-mentioned polarizing reflection plate and the above-mentioned liquid crystal panel.

According to the above-mentioned structure, the above-mentioned liquid crystal display unit further achieves an effect of being able to display a high-contrast image at wide viewing angle.

Furthermore, it is preferable that the above-mentioned polarizing reflection plate be DBEF (Dual Brightness Enhancement Film).

Moreover, it is preferable that the above-mentioned optical sensor be formed of a plurality of photodiodes or a plurality of phototransistors.

Further, it is preferable that the above-mentioned liquid crystal panel include an active matrix substrate, an opposite substrate, and a liquid crystal layer disposed therebetween.

In order to resolve the above-mentioned problem, an area sensor of the present invention includes: a liquid crystal panel including an optical sensor for detecting an intensity distribution of light entered from a front side; a light-emitting part that emits light onto the above-mentioned liquid crystal panel from a rear side; and a polarizing reflection plate that transmits, among light emitted from the above-mentioned light-emitting part and transmitted through the above-mentioned liquid crystal panel, a component of the light that oscillates in a direction parallel to a transmission axis of a polarizing plate disposed on a front side of the above-mentioned liquid crystal panel, and that reflects a component of the light that oscillates in a direction perpendicular to the above-mentioned transmission axis, the polarizing reflection plate being disposed between the above-mentioned liquid crystal panel and the above-mentioned polarizing plate.

According to the above-mentioned structure, when an object is not touching the above-mentioned polarizing plate and if the orientation of liquid crystals constituting the above-mentioned liquid crystal panel is controlled to be uniform, the oscillation direction of light, which has been emitted from the above-mentioned light-emitting part and transmitted through the above-mentioned liquid crystal panel, becomes uniform. Therefore, in this case, the intensity of reflected light, which is reflected in respective regions of the above-mentioned polarizing reflection plate, also becomes uniform, and the above-mentioned optical sensor detects light having a uniform intensity distribution.

Further, when an object touches the above-mentioned polarizing plate and if the orientation of liquid crystal molecules, which constitute the liquid crystal layer of the above-mentioned liquid crystal panel, is controlled to be uniform, the liquid crystal orientation changes in the touched region. Then, the oscillation direction of light transmitted through the touched region of the above-mentioned liquid crystal panel becomes different from the oscillation direction of light transmitted through other regions of the above-mentioned liquid crystal panel. That is, the intensity of reflected light, which has been reflected in the region on the above-mentioned polarizing reflection plate that overlaps with the touched region of the above-mentioned liquid crystal panel, becomes different from the intensity of reflected light reflected on other regions of the above-mentioned polarizing reflection plate.

Therefore, when an object touches the above-mentioned polarizing plate, the above-mentioned optical sensor detects light having an intensity distribution in which a region corresponding to the touched position has intensity different from the intensity of other regions, and in which the other regions have uniform intensity.

Accordingly, when the orientation of liquid crystals constituting the above-mentioned liquid crystal panel is controlled to be uniform, whether or not light emitted from the above-mentioned light-emitting part transmits through the above-mentioned polarizing plate, it is possible to detect a position on a surface of the polarizing plate where an object touches based on the intensity distribution of light, which is detected by the optical sensor when the object touches the polarizing plate.

Effects of the Invention

In order to resolve the above-mentioned problem, the liquid crystal display unit of the present invention includes a liquid crystal panel including an optical sensor for detecting the intensity distribution of light entered from a front side; a light-emitting part that emits light onto the above-mentioned liquid crystal panel from a rear side; and a polarizing reflection plate that transmits, among light emitted from the above-mentioned light-emitting part and transmitted through the above-mentioned liquid crystal panel, a component of the light that oscillates in a direction parallel to the transmission axis of a polarizing plate disposed on a front side of the above-mentioned liquid crystal panel, and reflects a component of the light that oscillates in a direction perpendicular to the above-mentioned transmission axis, the polarizing reflection plate being disposed between the above-mentioned liquid crystal panel and the above-mentioned polarizing plate.

Therefore, when the orientation of the liquid crystals constituting the above-mentioned liquid crystal panel is controlled to be uniform, even when an image displayed on the above-mentioned liquid crystal panel is a black image, it is possible to detect a position where an object touches on a surface of the polarizing plate based on the intensity distribution of light, which has been detected by the optical sensor when the object touches the polarizing plate.

BRIEF DESCRIPTION OF THE DRAWINGS

FIG. 6(a) is a block diagram showing the structure of main parts of a liquid crystal display unit equipped with a lens device, and FIG. 6(b) is a view showing a characteristic of the lens device.

DETAILED DESCRIPTION OF EMBODIMENTS

A liquid crystal display unit according to an embodiment of the present invention will be described below with reference to FIGS. 1 to 3. However, the present invention is not limited to this.

The structure of the liquid crystal display unit according to the present embodiment will be described with reference to FIG. 1. A liquid crystal display unit 100 shown in FIG. 1 includes an area sensor function for detecting an input position by sensing an image on the display panel surface by optical sensor elements formed in respective pixels.

Figure 1:
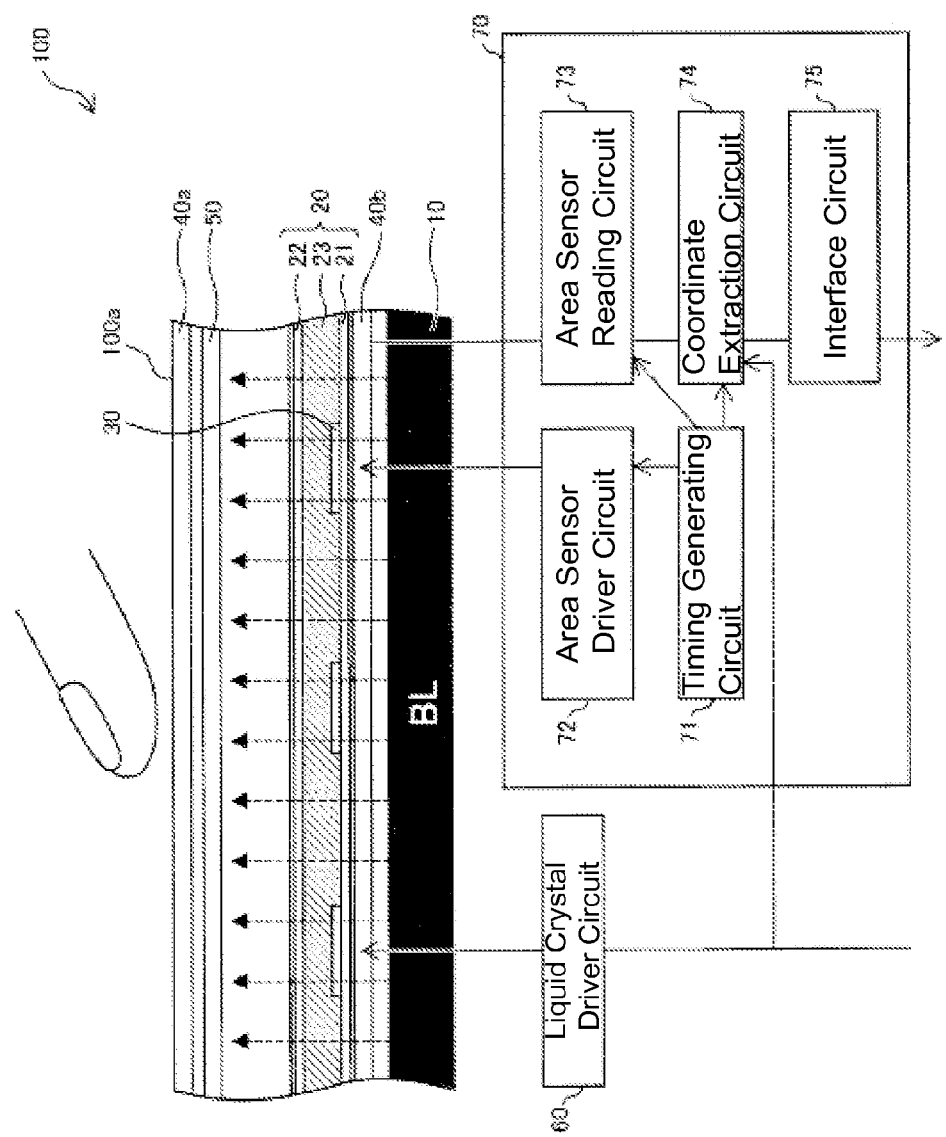
FIG. 1 shows an embodiment of the present invention, and is a block diagram showing the structure of main parts of a liquid crystal display unit.

As shown in FIG. 1, the liquid crystal display unit 100 of the present embodiment includes a liquid crystal panel 20 and a backlight 10 (a light-emitting part), which emits light from a rear side of the liquid crystal panel 20.

The liquid crystal panel 20 includes an active matrix substrate 21 in which a plurality of pixels are arranged in a matrix, and an opposite substrate 22 disposed so as to face the active material substrate 21, and further has a liquid crystal layer 23, which is a display medium, held between these two substrates. Further, in the present embodiment, there is no special limitation for the display mode of the liquid crystal panel 20, and various display modes, such as TN mode, IPS mode, and VA mode, can be applied.

Moreover, a front side polarizing plate 40a and a rear side polarizing plate 40b are respectively formed on a front side and a rear side of the liquid crystal panel 20.

The polarizing plates 40a and 40b respectively function as a polarizer. When a liquid crystal material sealed in the liquid crystal layer 23 is a vertical alignment type, for example, as a result of respectively disposing the polarizing direction of the front side polarizing plate 40a and the polarizing direction of the rear side polarizing plate 40b so as to be in a crossed Nicols state, a liquid crystal display device in the normally black mode can be achieved.

A polarizing reflection plate 50 is formed between the front side polarizing plate 40a and the liquid crystal panel 20. As shown in FIG. 3, the polarizing reflection plate 50 has a function of transmitting a component of incident light that oscillates in a direction parallel to the transmission axis, and reflecting a component of the light that oscillates in a direction perpendicular to the transmission axis. As a result of disposing such polarizing reflection plate 50 in a manner that the direction of the transmission axis of the polarizing reflection plate 50 matches the direction of the transmission axis of the front side polarizing plate 40a, the polarizing reflection plate transmits, among light emitted from the backlight 10, a component of the light that oscillates in a direction parallel to the transmission axis of the front polarizing plate 40a, and reflects a component of the light that oscillates in a direction perpendicular to the transmission axis. That is, among light emitted from the backlight 10, a component of the light that oscillates in a direction parallel to the transmission axis of the front polarizing plate 40*a* passes through the front polarizing plate 40*a*, and meanwhile, a component of the light that oscillates in a direction perpendicular to the transmission axis of the front polarizing plate 40*a* is reflected on the polarizing reflection plate 50. Light reflected on the polarizing reflection plate 50 enters optical sensor elements 30, which will be described later. Further, an example of the polarizing reflection plate 50 is DBEF (Dual Brightness Enhancement Film), for example, but is not limited to this. That is, any polarizing reflection plate may be used as long as it has the function of transmitting a component of incident light, which oscillates in a direction parallel to the transmission axis, and reflecting a component of the light that oscillates in a direction perpendicular to the transmission axis, and therefore, a wire grid polarizing plate can also constitute the polarizing reflection plate 50, for example.

Figure 4:
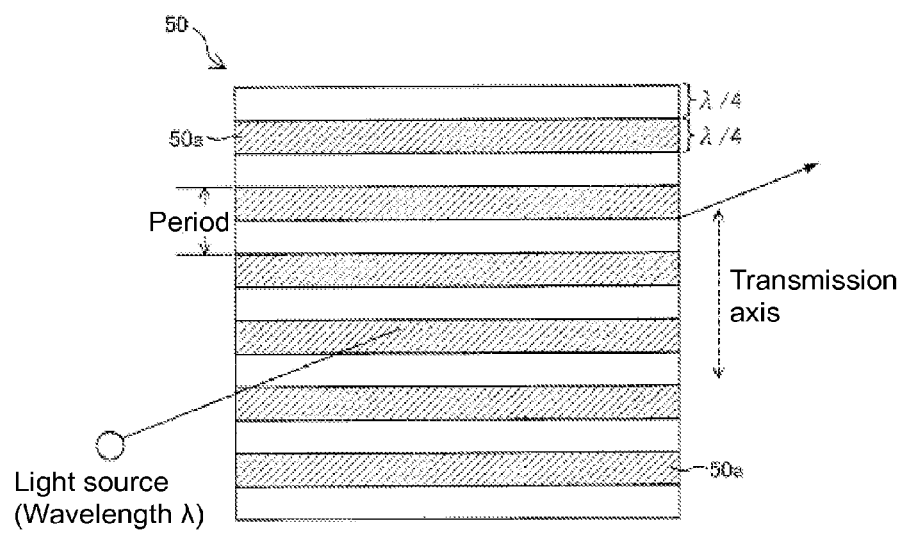
FIG. 4 shows an embodiment of the present invention, and is a view showing a wire grid polarizing plate used as a polarizing reflection plate.

Here, the wire grid polarizing plate may include a plurality of metal wires, which are disposed substantially in parallel with each other such that the period becomes equal to or less than the wavelength of incident light. As shown in FIG. 4, a wire grid polarizing plate in which metal wires 50*a*, which have the width of approximately one fourth of the wavelength of the incident light, are disposed at intervals of one fourth of the wavelength of the incident light, may also be used, for example. Here, the period means a sum of the width of the metal wire and the distance to an adjacent metal wire. Incident light that has polarization in a direction parallel to a longitudinal direction of the metal wires is absorbed as oscillation of free electrons within the metal wires and is then reflected, but incident light that has polarization in a direction perpendicular to the longitudinal direction of the metal wires passes through because the width of the metal wire is narrower than the wavelength, and therefore, the oscillation is not transmitted to the free electrons of the metal. With this structure, the wire grid polarizing plate functions as a polarizing reflection plate, which reflects incident light having polarization parallel to the longitudinal direction of the wires, and transmits incident light having polarization in the perpendicular direction. Additionally, it is preferable that a material for the metal wires have high light reflection rate, and aluminum and silver are preferable, for example, but not limited to these. Moreover, the wire grid polarizing plate is disposed such that the direction of its transmission axis (an axis on the wire grid polarizing plate, which is perpendicular to the longitudinal direction of the metal wires) matches the direction of the transmission axis of the front side polarizing plate 40*a*.

In the active matrix substrate 21, TFTs that are switching elements for driving respective pixels (not shown in the figures), an alignment film (not shown in the figures), optical sensor elements 30, and the like are formed.

Further, in the opposite substrate 22, color filter layers, opposite electrodes, an alignment film, and the like are formed although not shown in the figures. The color filter layers are made of colored parts having each color of red (R), green (G), and blue (B), and a black matrix.

In the liquid crystal display unit 100 of the present embodiment, a plurality of optical sensor elements 30 are disposed inside the liquid crystal panel 20 at prescribed intervals, and these optical sensor elements constitute an optical sensor. The respective optical sensor elements 30 are driven by power supplied from an area sensor driver circuit 72, which will be described later, and detect reflected light from the polarizing reflection plate 50.

The optical sensor elements 30 are means for generating optical current in accordance with the intensity of received light, and can be made of photodiodes or phototransistors, for example. Furthermore, the TFTs and the optical sensor elements 30 may also be formed on the active matrix substrate 21 in a monolithic manner by an almost identical process. That is, a part of constituent members of the optical sensor elements 30 may also be formed simultaneously with a part of constituent members of the TFTs. Such a method of forming the optical sensor elements can be performed according to a method for manufacturing a liquid crystal display unit of an optical sensor element built-in type, which is conventionally known.

Further, the optical sensor elements 30 may either be included in every pixel or in every picture unit. For example, the optical sensor elements may also be formed in every pixel, which includes one color filter of any one of R, G, or B.

Moreover, as shown in FIG. 1, the liquid crystal display unit 100 includes a liquid crystal driver circuit 60, which drives the liquid crystal panel 20 in accordance with image signals supplied from outside, and an area sensor controlling part 70 that controls the optical sensor. A structure conventionally known to the public can be applied to the structure of the liquid crystal driver circuit 60.

As shown in FIG. 1, the area sensor controlling part 70 includes a timing generating circuit 71, an area sensor driver circuit 72, an area sensor reading circuit 73, a coordinate extraction circuit 74, and an interface circuit 75.

The timing generating circuit 71 is means for supplying timing signals to the area sensor driver circuit 72, the area sensor reading circuit 73, and the coordinate extraction circuit 74 to synchronize these circuits.

The area sensor driver circuit 72 is means for driving the area sensor by supplying electric power to the respective optical sensor elements 30.

The area sensor reading circuit 73 is means for reading optical current generated in the respective optical sensor elements 30, and generating an image that shows an intensity distribution of light entered to the optical sensor (hereinafter referred to as a detected image). A detected image generated by the area sensor reading circuit 73 is an image in which the gray scale value is high for pixels corresponding to the optical sensor elements 30 with a high received light intensity, and in which the gray scale value is low for pixels corresponding to the optical sensor elements 30 with a low received light intensity, for example.

The coordinate extraction circuit 74 determines coordinates indicating a position touched by an object (a finger, an input pen or the like) according to the detected image generated by the area sensor reading circuit 73 and a display image supplied from outside that is to be displayed on the liquid crystal panel 20. Specifically, the coordinate extraction circuit 74 first generates a negative image of the display image.

The coordinate extraction circuit 74 then generates a differential image between the detected image and the negative image. Then, the coordinate extraction circuit 74 calculates the representative coordinates of a region with high gray scale (a region made of pixels having gray scale equal to or higher than a prescribed threshold) in the differential image. Here, the representative coordinates are average values of the coordinates of pixels constituting the region with high gray scale, for example. Additionally, the number of the representative coordinates to be calculated may be one or multiple.

The interface circuit 75 is means for outputting the representative coordinates, which has been calculated at the coordinate extraction circuit 74, to other controlling parts within the liquid crystal display unit 100. The representative coordinates, which have been outputted from the interface circuit 75, is referred to by the other controlling parts in order to perform processes in accordance with the position specified by a user with a finger, a pen or the like, for example.

Figure 2:
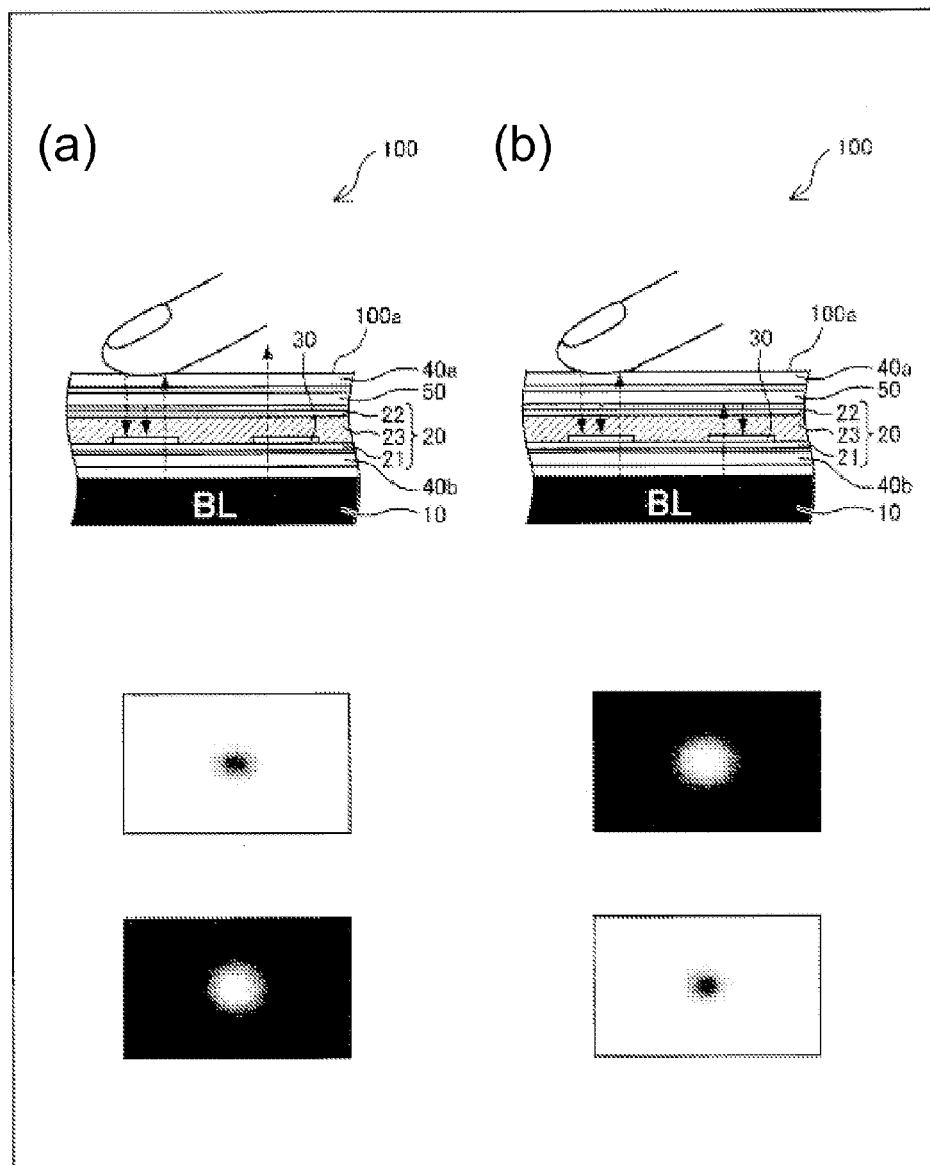
FIG. 2 shows an embodiment of the present invention, and FIGS. 2(a) and 2(b) respectively show images displayed on a liquid crystal panel when a pooling phenomenon is occurring (images in the middle), and images generated in accordance with the intensity distribution of light, which was detected by optical sensor elements (images at the bottom) when the liquid crystal is driven by receiving image signals from outside showing a white image and a black image.
Figure 3:
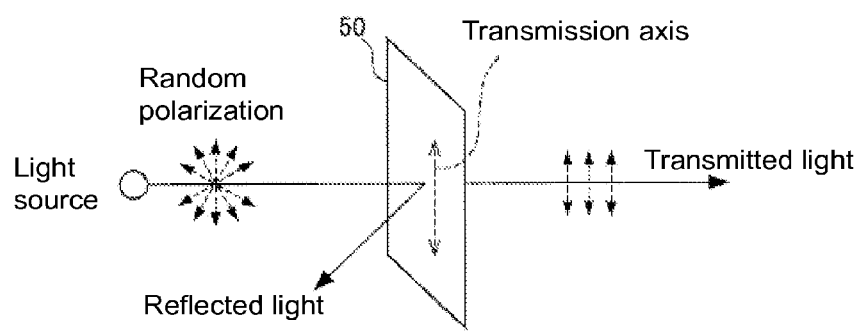
FIG. 3 shows an embodiment of the present invention, and is a view showing a characteristic of the polarizing reflection plate.

With reference to FIG. 2, a more detailed description will be made to explain that the representative coordinates determined in this manner are coordinates that indicate a position touched by a finger or an input pen.

FIGS. 2(a) and 2(b) respectively show images displayed on the liquid crystal panel 20 (images in the middle), and detected images generated by the area sensor reading circuit 73 (images at the bottom) when the liquid crystal driver circuit 60 is receiving image signals from outside showing a white image or a black image to drive the liquid crystal, and when a finger or a pen is touching a detection target surface 100a, causing a pooling phenomenon.

As shown in FIG. 2(b), in a case where the liquid crystal panel 20 is driven by receiving image signals showing a black image, light emitted from the backlight 10 is reflected on the polarizing reflection plate 50 in a region unaffected by the pooling phenomenon (where the liquid crystal orientation is not disturbed). Meanwhile, light emitted from the backlight 10 passes through the polarizing reflection plate 50 in a region affected by the pooling phenomenon (where pushed by a finger or a pen so that the liquid crystal orientation is disturbed). Accordingly, a detected image generated by the area sensor reading circuit 73 becomes a white image in which the gray scale of the region touched by a finger or an input pen is lowered. Therefore, in a differential image between a white image, which is a negative image of a black image that is to be displayed on the liquid crystal panel 20, and the detected image generated by the area sensor reading circuit 73, the region touched by a finger or an input pen becomes a region with high gray scale, and it is possible to obtain coordinates indicating the position touched by a finger or an input pen by calculating the representative coordinates of this region with high gray scale.

Further, as shown in FIG. 2(a), in a case where the liquid crystal panel 20 is driven by receiving image signals showing a white image, light emitted from the backlight 10 passes through the polarizing reflection plate 50 in a region unaffected by the pooling phenomenon (where the liquid crystal orientation is not disturbed). Meanwhile, light emitted from the backlight 10 is reflected on the polarizing reflection plate 50 in the area affected by the pooling phenomenon (where pushed by a finger or a pen so that the liquid crystal orientation is disturbed). Accordingly, a detected image generated by the area sensor reading circuit 73 becomes a black image having a region with high gray scale in the area touched by a finger or an input pen. Therefore, in a differential image between a black image, which is a negative image of a white image that is to be displayed on the liquid crystal panel 20, and the detected image generated by the area sensor reading circuit 73, a region touched by a finger or an input pen becomes a region with high gray scale, and it is possible to obtain coordinates indicating the position touched by a finger or an input pen by calculating the representative coordinates of this region with high gray scale.

A description has been made above to explain that the coordinate extraction circuit 74 can extract a position touched by a finger or a pen whether an image displayed by image signals is a white image or a black image, but it is also possible to similarly detect a position touched by a finger or a pen for any image.

Therefore, the liquid crystal display unit 100 of the present embodiment can detect a position touched by a finger or a pen, no matter what image is displayed on the liquid crystal panel 20.

Figure 6:
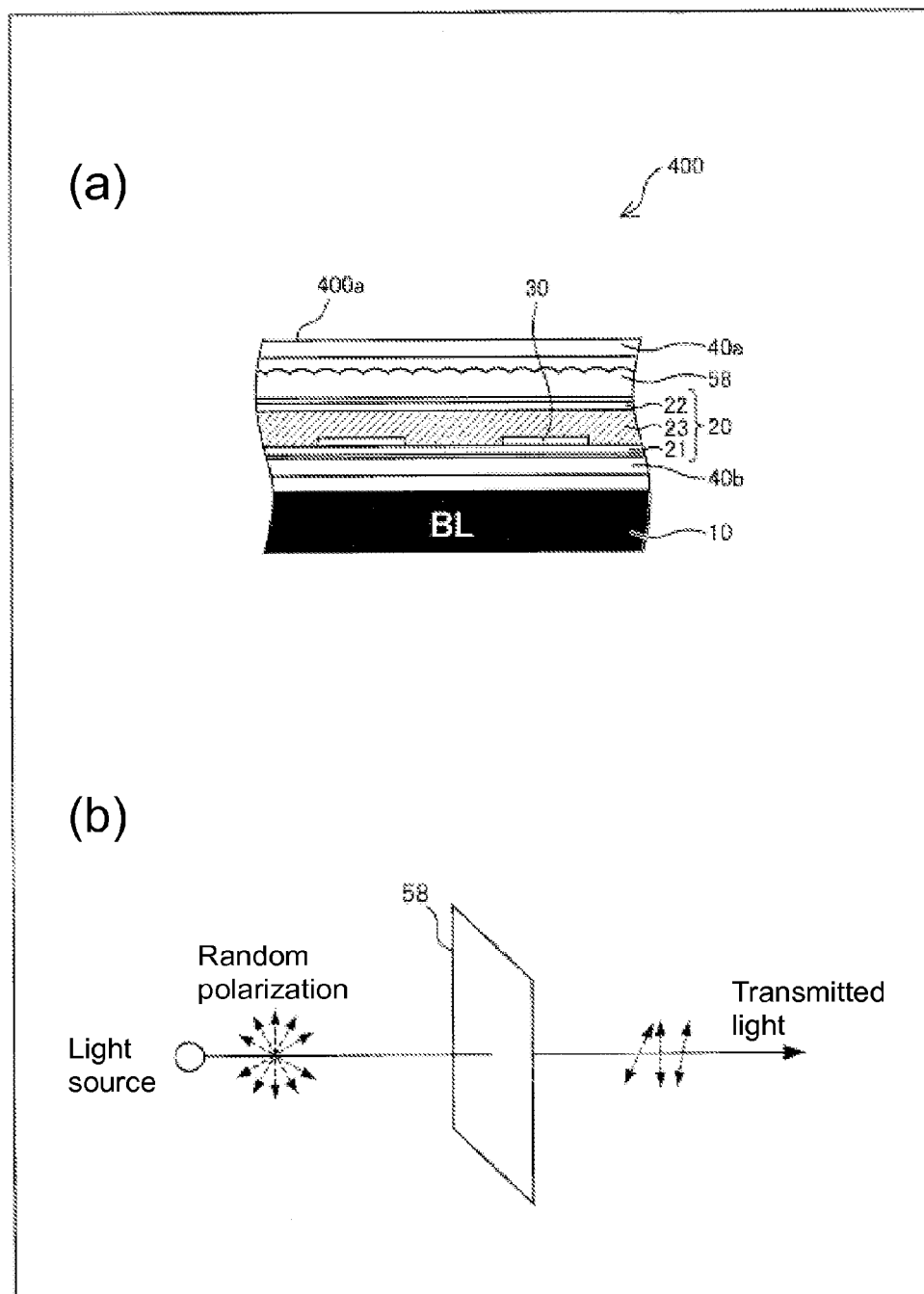
FIG. 6 shows a conventional technique.
Figure 7:
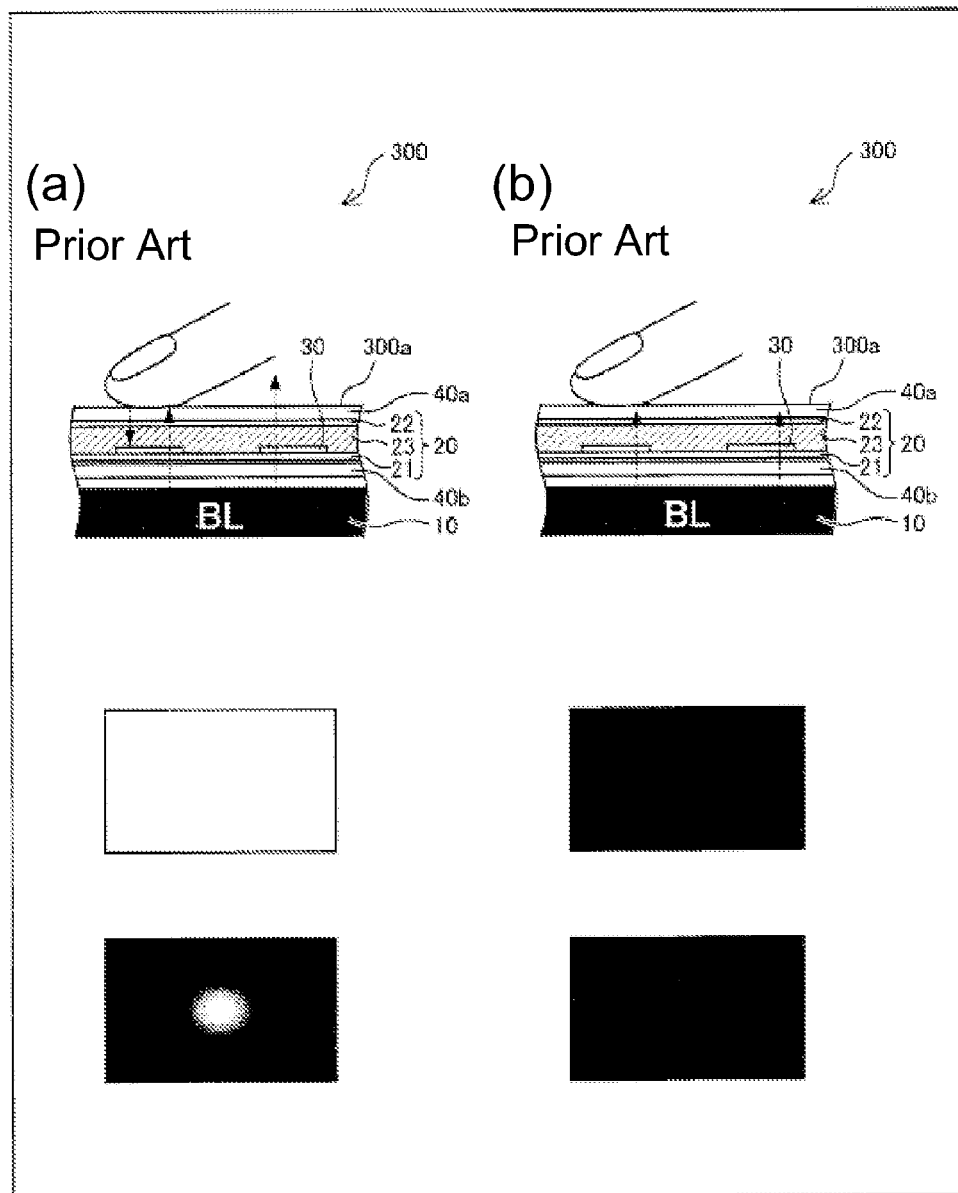
FIG. 7 shows a conventional technique, and FIGS. 7(a) and 7(b) respectively show images displayed on a liquid crystal panel when a finger or a pen is touching a detection target surface (images in the middle), and images generated in accordance with the intensity distribution of light detected by optical sensor elements (images at the bottom).

Further, as shown in FIG. 6(a), there is a conventional liquid crystal display unit 400, which includes a lens device 58 between the liquid crystal panel 20 and the front side polarizing plate 40a, but as shown in FIG. 6(b), there was a problem in which polarization becomes disorderly when light that has passed through the liquid crystal panel 20 passes through the lens device 58, causing a lowering of contrast. In the liquid crystal display unit 100 of the present embodiment, the liquid crystal reflection plate 50 only transmits, among light emitted from the backlight 10 and transmitted through the liquid crystal panel 20, a component of the light that oscillates in a direction parallel to the transmission axis of the front side polarizing plate 40a, and therefore, vector components of the reflection axis and the transmission axis of the liquid crystal reflection plate 50 respectively match vector components of the absorption axis and the transmission axis of the front side polarizing plate 40a, achieving effects that the polarization does not become disorderly and the contrast is not lowered.

Furthermore, the present invention also encompasses an area sensor in which the function of displaying any image is removed from the liquid crystal display unit 100 described above. Such an area sensor can be achieved by removing the liquid crystal driver circuit 60 from the liquid crystal display unit 100, for example.

In this case, the coordinate extraction circuit 74 determines coordinates indicating a position touched by an object (a finger, an input pen or the like) according to a detected image generated by the area sensor reading circuit 73, and a prescribed image (an image that is otherwise to be generated by the area sensor reading circuit 73 if a pooling phenomenon did not occur). Specifically, the coordinate extraction circuit 74 generates a differential image between the detected image and the above-mentioned prescribed image. Then, the coordinate extraction circuit 74 calculates representative coordinates of a region with high gray scale (a region made of pixels having gray scale that is equal to or higher than a defined threshold) in the differential image.

Alternatively, the coordinate extraction circuit 74 may detect a region where the gray scale value is different from other regions within the detected image, which has been generated at the area sensor reading circuit 73 (a region where an absolute value between the gray scale value and a prescribed value is equal to or higher than a specific threshold), and calculate representative coordinates of the region with a different gray scale value.

It has already been explained that the representative coordinates calculated in this way are coordinates indicating a position touched by a finger or an input pen, and therefore, the description is omitted here.

Modified Example

A liquid crystal display unit 200 according to a modified example of the present embodiment will be described below with reference to FIG. 5. However, the present invention is not limited to this. Here, the description of the modified example of the present embodiment includes description of structural components, which are different from the liquid crystal display unit 100 already described, among the structural components of a liquid crystal display unit 200 equipped with an area sensor function.

Figure 5:
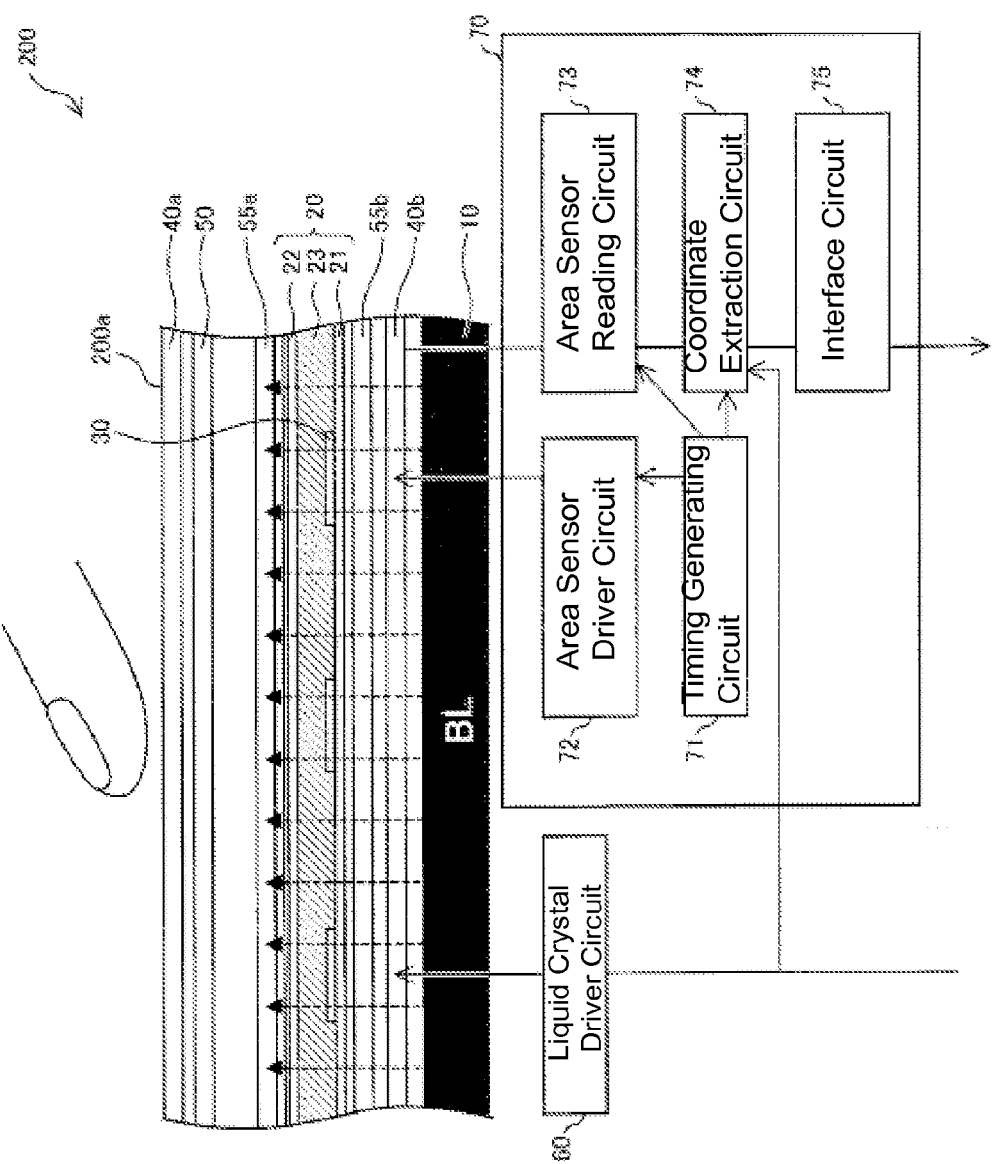
FIG. 5 shows a modified example of an embodiment of the present invention, and is a block diagram showing the structure of main parts of the liquid crystal display unit.

FIG. 5 shows the structure of the liquid crystal display unit 200 of the present embodiment.

As shown in FIG. 5, the liquid crystal display unit 200 of the present embodiment includes a front side retarder 55a between a liquid crystal panel 20 and a polarizing reflection plate 50, and a rear side retarder 55b between the liquid crystal panel 20 and a rear side polarizing plate 40b, respectively, as an optical compensation element. The front side retarder 55a and the rear side retarder 55b are disposed for the purpose of improving transmittance and a view angle characteristic, in a case where a liquid crystal material sealed in the liquid crystal layer 23 is a vertical alignment type, for example. Accordingly, the liquid crystal display unit 200 of the present embodiment further has an effect of being able to display a higher contrast image at a wider viewing angle compared to the liquid crystal display unit 100.

The present invention is not limited to the above-described embodiments, and various modifications within the scope of the claims are possible. That is, a technical scope of the present invention also includes embodiments, which can be achieved by combining technical means that have been appropriately modified within the scope of the claims.

INDUSTRIAL APPLICABILITY

The present invention can preferably be used for a liquid crystal display unit with an area sensor function.

DESCRIPTION OF REFERENCE CHARACTERS 10 backlight (light-emitting part)
20 liquid crystal panel
21 active matrix substrate
22 opposite substrate
23 liquid crystal layer
30 optical sensor elements
40a front side polarizing plate (polarizing plate disposed on a front side of the liquid crystal panel)
40b rear side polarizing plate
50 polarizing reflection plate
50a metal wire
60 liquid crystal driver circuit
55a front side retarder (retarder)
55b rear side retarder
58 lens device
70 area sensor controlling part
71 timing generating circuit
72 area sensor driver circuit
73 area sensor reading circuit (detected image generation means)
74 coordinate extraction circuit (negative image generation means, differential image generation means, extraction means)
75 interface circuit
100 liquid crystal display unit
100a panel surface (detection target surface)
200 liquid crystal display unit
200a panel surface (detection target surface)
300a detection target surface
400a detection target surface

The invention claimed is:

1. A liquid crystal display unit, comprising:
a liquid crystal panel including an optical sensor for detecting an intensity distribution of light entered from a front side;
a light-emitting part that emits light onto said liquid crystal panel from a rear side; and
a polarizing reflection plate that transmits, among light emitted from said light-emitting part and transmitted through said liquid crystal panel, a component of the light that oscillates in a direction parallel to a transmission axis of a polarizing plate disposed on a front side of said liquid crystal panel, and reflects a component of the light that oscillates in a direction perpendicular to said transmission axis, the polarizing reflection plate being disposed between said liquid crystal panel and said polarizing plate.

2. The liquid crystal display unit according to claim 1, further comprising:
a detected image generator that generates a detected image, indicating an intensity distribution of light detected by said optical sensor;
a negative image generator that generates a negative image of an image displayed on said liquid crystal panel;
a differential image generator that generates a differential image between said negative image and said detected image; and
an extractor that extracts coordinates of pixels, having gray scale equal to or higher than a prescribed threshold in said differential image.

3. The liquid crystal display unit according to claim 1, wherein a retarder is disposed between said polarizing reflection plate and said liquid crystal panel.

4. The liquid crystal display unit according to claim 1, wherein said polarizing reflection plate is DBEF (Dual Brightness Enhancement Film).

5. The liquid crystal display unit according to claim 1, wherein said optical sensor is formed of a plurality of photodiodes or a plurality of phototransistors.

6. The liquid crystal display unit according to claim 1, wherein said liquid crystal panel includes an active matrix substrate, an opposite substrate, and a liquid crystal layer disposed therebetween.

7. An area sensor comprising:
a liquid crystal panel including an optical sensor for detecting an intensity distribution of light entered from a front side;
a light-emitting part that emits light onto said liquid crystal panel from a rear side; and
a polarizing reflection plate that transmits, among light emitted from said light-emitting part and transmitted through said liquid crystal panel, a component of the light that oscillates in a direction parallel to a transmission axis of a polarizing plate disposed on a front side of said liquid crystal panel, and reflects a component of the light that oscillates in a direction perpendicular to said transmission axis, the polarizing reflection plate being disposed between said liquid crystal panel and said polarizing plate.

8. A position detection method of detecting a position where an object touches on a front side of a liquid crystal panel, comprising:
emitting light onto said liquid crystal panel from a rear side,
using a polarizing reflection plate disposed between said liquid crystal panel and a polarizing plate disposed on a front side of said liquid crystal panel, transmitting a component of light passed through said liquid crystal panel that oscillates in a direction parallel to a transmission axis of said polarizing plate, and reflecting a component of the light that oscillates in a direction perpendicular to said transmission axis; and
detecting an intensity distribution of light entered from said front side to detect said position.

* * * * *